United States Patent
Cai et al.

(10) Patent No.: US 11,501,648 B2
(45) Date of Patent: Nov. 15, 2022

(54) METHOD AND APPARATUS FOR PREDICTING FLIGHT DELAY, DEVICE AND STORAGE MEDIUM

(71) Applicant: BEIHANG UNIVERSITY, Beijing (CN)

(72) Inventors: Kaiquan Cai, Beijing (CN); Yue Li, Beijing (CN); Daozhong Feng, Beijing (CN); Weinan Wu, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 383 days.

(21) Appl. No.: 16/851,124

(22) Filed: Apr. 17, 2020

(65) Prior Publication Data
US 2021/0005090 A1    Jan. 7, 2021

(30) Foreign Application Priority Data
Apr. 15, 2019 (CN) .......................... 201910301274.7

(51) Int. Cl.
G08G 5/00    (2006.01)
G06N 20/10   (2019.01)
G06K 9/62    (2022.01)

(52) U.S. Cl.
CPC .......... *G08G 5/003* (2013.01); *G06K 9/6228* (2013.01); *G06K 9/6262* (2013.01); *G06N 20/10* (2019.01)

(58) Field of Classification Search
CPC ...... G08G 5/003; G06N 20/10; G06K 9/6228; G06K 9/6262
See application file for complete search history.

(56) References Cited

U.S. PATENT DOCUMENTS 7,085,726 B1    8/2006 Galperin
2019/0304090 A1*  10/2019 Wang ................... G06K 9/6273

FOREIGN PATENT DOCUMENTS

| CN | 102867221 A | 1/2013 |
| CN | 104156594 A | 11/2014 |
| CN | 105205297 A | 12/2015 |
| CN | 105844346 A | 8/2016 |
| CN | 106991285 A | 7/2017 |

(Continued)

OTHER PUBLICATIONS

Yi Ding, Predicting flight delay based on multiple linear regression, 2017, IOP Conf. Series: Earth and Environmental Science 81, 8 pages (Year: 2017).*

(Continued)

*Primary Examiner* — David F Dunphy
(74) *Attorney, Agent, or Firm* — J.C. Patents

(57) ABSTRACT

The disclosure provides a method and an apparatus for predicting flight delay, a device and a storage medium. The method includes: acquiring flight historical data, where the flight historical data includes take-off amount and delay amount of flights during each of a plurality of time periods; determining prior knowledge of each of the plurality of time periods according to the take-off amount and the delay amount of the flights during each of the plurality of time periods; constructing a SVM prediction model according to the prior knowledge and a standard SVM model; and predicting a flight delay situation according to the SVM prediction model. The prediction of the flight delay situation for each of the plurality of time periods is realized.

15 Claims, 4 Drawing Sheets

(56) References Cited

FOREIGN PATENT DOCUMENTS

| CN | 107016455 A | 8/2017 |
|---|---|---|
| CN | 107316501 A | 11/2017 |
| CN | 107766987 A | 3/2018 |
| CN | 108122052 A | 6/2018 |
| CN | 108710623 A | 10/2018 |
| CN | 109492334 A | 3/2019 |

OTHER PUBLICATIONS

Haiyan Chen, A Fuzzy Support Vector Machine with Weighted Margin for Flight Delay Early Warning, 2008, Fifth International Conference on Fuzzy Systems and Knowledge Discovery. vol. 3. IEEE, 5 pages (Year: 2008).*

The first Office Action of the priority CN application.

"Airport flight delay prediction based on SVM regression", Journal of Civil Aviation University of China, vol. 36, No. 1, Feb. 2018.

"Analysis of Weather-caused Massive Delay Response System (MDRS) in East China in 2017", Journal of Civil Aviation Flight University of China, vol. 30, No. 2, Mar. 2019.

"Early Warning Model of Flight Delay Based on SVM with Incorporated Prior Knowledge", Journal of Nanjing University of Aeronautics & Astronautics, vol. 41, No. 2, Apr. 2009.

"Improvement of meteorological service level indirectly affected by weather warning capacity evaluation of large area flight delay", Air Traffic Management Bureau of central and southern China Civil Aviation Bureau.

"The Research on Flight Delays Prediction Model and Method Based on Data Mining", Nanjing University of Aeronautics and Astronautics, a Thesis in Computer Science and Technology By LiuXiaofei (Dec. 2010).

\* cited by examiner

METHOD AND APPARATUS FOR PREDICTING FLIGHT DELAY, DEVICE AND STORAGE MEDIUM

CROSS-REFERENCE TO RELATED APPLICATIONS

The present application claims priority to Chinese Patent Application No. 201910301274.7 filed on Apr. 15, 2019, the content of which is hereby incorporated by reference in its entirety.

TECHNICAL FIELD

The disclosure relates to the field of flight delay prediction technologies and, in particular, to a method and an apparatus for predicting flight delay, a device and a storage medium.

BACKGROUND

With the rapid development of air-transport industry, the airport throughput of a country increases year by year under the driving by both of airport and regional economy, and accordingly the normal departure rate of flights decreases year by year. Predictive analysis of flight delay is significantly important for an air traffic flow management department and airline companies to make decisions, which can not only assist the air traffic flow management department to take measures to reduce economic losses but also remind the passengers to change the schedule in advance by issuing delay warning information. Therefore, it is an effective method for solving the problem of delay to accurately predict flight departures and landings.

Flight execution is affected by multiple factors together, such as weather, airline companies, airports and the like, and these factors are highly random. Therefore, in the prior art, regarding the method for predicting delay in departures and landings of flights, a flight delay spread model and a data mining method based on a statistical learning theory are commonly used to predict short-time delay rate or average delay time of flights. For example, an aircrew needs to execute multiple flights, and there exists a time connection between the multiple flights, therefore the delay of one flight may influence downstream flights, and the delay in the downstream flights may be continuously spread, which would result in a widespread delay. In the prior art, the spread delay rate and the average delay time for the downstream flights are generally studied to carry out a prediction of departures and landings of the flights.

However, the attention is merely focused on the short-time delay rate and the average delay time in the prior art, without a prediction of the flight operation situation of an airport in terms of time period.

SUMMARY

The present disclosure provides a method and an apparatus for predicting flight delay, a device and a storage medium, to realize the prediction of flight delay during each of a plurality of time periods.

In a first aspect, an embodiment of the present disclosure provides a method for predicting flight delay, including:

acquiring flight historical data, where the flight historical data includes take-off amount and delay amount of flights during each of a plurality of time periods;

determining prior knowledge of each of the plurality of time periods according to the take-off amount and the delay amount of the flights during each of the plurality of time periods;

constructing a support-vector-machine (SVM) prediction model according to the prior knowledge and a standard SVM model; and predicting a flight delay situation according to the SVM prediction model.

In this solution, by determining the prior knowledge of each of the plurality of time periods according to the take-off amount and the delay amount of flights during each of the plurality of time periods in the flight historical data and constructing the SVM prediction model according to the prior knowledge and the standard SVM model, the accuracy of the SVM prediction model is improved; and further by predicting the flight delay situation according to the SVM prediction model, the prediction of the flight delay situation for each of the plurality of time periods is achieved and the reliability of the flight delay prediction is improved.

Optionally, the method for predicting flight delay provided in the embodiment of the present application further includes:

acquiring massive delay response system (MDRS) information; and verifying the SVM prediction model according to the MDRS information.

In this solution, by verifying the SVM prediction model according to the MDRS information, the SVM prediction model is made closer to the actual flight operation and the reliability of the model is improved.

Optionally, the verifying the SVM prediction model according to the MDRS information includes:

acquiring a first flight delay prediction result according to the SVM prediction model; comparing a second flight delay prediction result in the MDRS information with the first flight delay prediction result; and updating the SVM prediction model according to the MDRS information, if an error between the second flight delay prediction result and the first flight delay prediction result is larger than a preset error threshold.

In this solution, by comparing the flight delay prediction result acquired according to the SVM prediction model and the flight delay prediction result in the MDRS information, and updating the SVM prediction model according to the MDRS information when the error between two kinds of flight delay prediction results is larger than the preset error threshold, the accuracy of the SVM prediction model is improved.

Optionally, the flight historical data further includes at least one of the following:

flight historical delay time, planned flight time, an airline company, a destination airport, a departure direction, a flight model, a planned take-off time period and a planned take-off date.

Optionally, the predicting the flight delay situation according to the SVM prediction model includes:

selecting first flight historical data as a training set according to the flight historical data;

training the SVM prediction model according to the first flight historical data, and acquiring a trained SVM prediction model;

selecting second flight historical data as a test set according to the flight historical data;

testing the trained SVM prediction model according to the second flight historical data; and predicting the flight delay situation according the SVM prediction model that passes the test.

Optionally, the method for predicting flight delay provided in the embodiment of the present application further includes:

performing dimension reduction processing on the flight historical data according to the flight historical data.

The following are an apparatus for predicting flight delay, a device, a storage medium and a computer program product provided in embodiments of the present application, and the method for predicting flight delay in the first aspect or the optional implementations of the first aspect can be referred to for the content and effects thereof.

In a second aspect, an embodiment of the present application provides an apparatus for predicting flight delay, including:

a first acquisition module, configured to acquire flight historical data, where the flight historical data includes take-off amount and delay amount of flights during each of a plurality of time periods;

a determination module, configured to determine prior knowledge of each of the plurality of time periods according to the take-off amount and the delay amount of the flights during each of the plurality of time periods;

a construction module, configured to construct a SVM prediction model according to the prior knowledge and a standard SVM model; and a prediction module, configured to predict a flight delay situation according to the SVM prediction model.

Optionally, the apparatus for predicting flight delay further includes:

a second acquisition module, configured to acquire massive delay response system (MDRS) information; and a verification module, configured to verify the SVM prediction model according to the MDRS information.

Optionally, the verification module includes:

an acquisition submodule, configured to acquire a first flight delay prediction result according to the SVM prediction model;

a comparison submodule, configured to compare a second flight delay prediction result in the MDRS information and the first flight delay prediction result; and an updating submodule, configured to update the SVM prediction model according to the MDRS information, if an error between the second flight delay prediction result and the first flight delay prediction result is larger than a preset error threshold.

Optionally, the flight historical data further includes at least one of the following:

flight historical delay time, planned flight time, an airline company, a destination airport, a departure direction, a flight model, a planned take-off time period and a planned take-off date.

Optionally, the prediction module is specifically configured to:

select first flight historical data as a training set according to the flight historical data;

train the SVM prediction model according to the first flight historical data, and acquire a trained SVM prediction model;

select second flight historical data as a test set according to the flight historical data;

test the trained SVM prediction model according to the second flight historical data; and predict the flight delay situation according to the SVM prediction model that passes the test.

Optionally, the apparatus for predicting flight delay provided in the embodiment of the present application further includes:

a processing module, configured to perform dimension reduction processing on the flight historical data according to the flight historical data.

In a third aspect, an embodiment of the present application provides a device, including:

a processor; a memory; and a computer program; where the computer program is stored in the memory and configured to be executed by the processor, and the computer program includes instructions for implementing the method for predicting flight delay according to the first aspect or optional implementations of the first aspect.

In a fourth aspect, an embodiment of the present application provides a computer readable storage medium, where the computer readable storage medium has a computer program stored thereon, and the computer program causes a server to implement the method for predicting flight delay according to the first aspect or optional implementations of the first aspect.

In a fifth aspect, an embodiment of the present disclosure provides a computer program product, including: executable instructions for implementing the method for predicting flight delay according to the first aspect or optional implementations of the first aspect.

Using the method and the apparatus for predicting flight delay, the device and the storage medium provided in the present disclosure, the flight historical data which includes the take-off amount and the delay amount of the flights during each of a plurality of time periods is acquired, and the prior knowledge of each of the plurality of time periods is determined according to the take-off amount and the delay amount of the flights during each of the plurality of time periods; the SVM prediction model is constructed according to the prior knowledge and the standard SVM model; and finally the flight delay situation is predicted according to the SVM prediction model. By determining the prior knowledge of each of the plurality of time periods according to the take-off amount and the delay amount of flights during each of the plurality of time periods in the flight historical data and constructing the SVM prediction model according to the prior knowledge and the standard SVM model, the accuracy of the SVM prediction model is improved; and further by predicting the flight delay situation according to the SVM prediction model, the prediction of the flight delay situation for each of the plurality of time periods is achieved and the reliability of the flight delay prediction is improved.

BRIEF DESCRIPTION OF DRAWING(S)

In order to illustrate the technical solutions of embodiments of the present disclosure or in the prior art, the accompany drawings that need to be used in the embodiments or the prior art are briefly described below. Obviously, the accompany drawings in the description below are some embodiments of the present disclosure, and for those skilled in the art, other drawings may also be acquired according to these accompany drawings without any creative effort.

DESCRIPTION OF EMBODIMENTS

Figure 1:
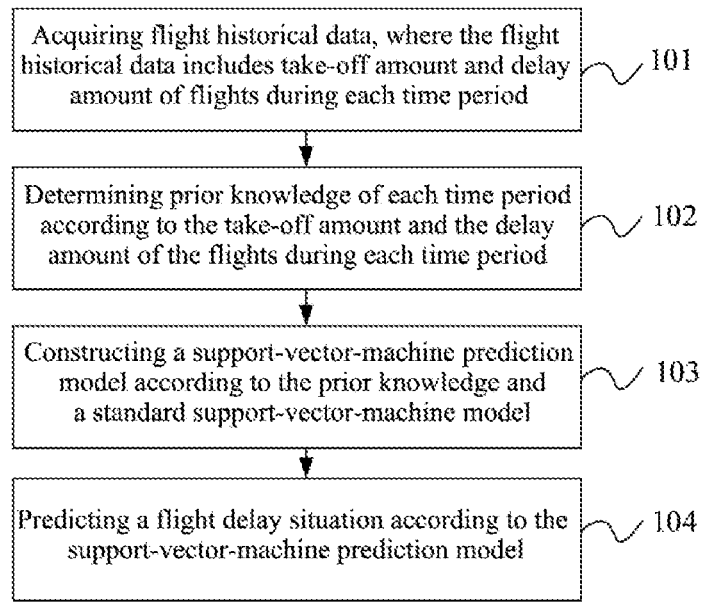
FIG. 1 is a schematic flowchart of a method for predicting flight delay provided in an embodiment of the present disclosure.

In order to make the purposes, technical solutions and advantages of embodiments of the present disclosure more clear, technical solutions of embodiments of the present application will be described clearly and completely below in combination with the accompanying drawings of embodiments of the present application. Obviously, the described embodiments are merely a part, but not all, of the embodiments of the present application. Based on embodiments of the present application, all the other embodiments acquired by those skilled in the art without any creative effort shall belong to the protection scope of the present application.

The terms of "first", "second", "third", "fourth" and the like (if exist) in the description, claims and the above accompanying drawings are used to distinguish similar objects, but do not necessarily describe a specific sequence or a specific order. It should be understood that the terms used in this way can be interchanged in appropriate cases, so that the embodiments of the present disclosure as described herein can be implemented in other sequence in addition to those illustrated or described herein. In addition, the terms "include", "have" and any other variations thereof are intended to cover a non-exclusive inclusion. For example, processes, methods, systems, products or devices which include a serial of steps or units are not necessarily limited to those steps or units being listed explicitly, but may include other steps or units that are not explicitly listed or that are inherent for these processes, methods, systems, products or devices.

With the rapid development of air-transport industry, the airport throughput of a country increases year by year under the driving by both of airport and regional economy, and accordingly the normal departure rate of flights decreases year by year. It is an effective method for solving the problem of delay to accurately predict flight departures and landings. Since the flights are affected by multiple factors together, such as weather, airline companies, airports and the like, and these effect factors are highly random, the attention is merely focused on the short-time delay rate and the average delay time in the prior art, without a prediction of flight operation situation of an airport for each of a plurality of time periods. In order to solve the above problem, embodiments of the present application provide a method and an apparatus for predicting flight delay, a device and a storage medium.

The exemplary application scenarios of embodiments of the present application are introduced below.

Predictive analysis of flight delay is significantly important for an air traffic flow management department and airline companies to make decisions, which can not only assist the air traffic flow management department to take measures to reduce economic losses but also remind the passengers to change the schedule in advance by issuing delay warning information. Flight execution is affected by multiple factors together, such as weather, airline companies, airports and the like, and these effect factors are highly random, thus it can be seen that the flight delay is unavoidable, with only the degree thereof simply varying in different stages of the development of the air-transport industry. On this basis, embodiments of the present application provide a method and an apparatus for predicting flight delay, a device and a storage medium.

FIG. 1 is a schematic flowchart of a method for predicting flight delay provided in an embodiment of the present disclosure. The method may be performed by an apparatus for predicting flight delay, and the apparatus may be implemented by means of software and/or hardware. For example, the apparatus may be a part or all of a terminal device, or a part or all of a server. The terminal device may be a personal computer, a smart phone, a user terminal, a tablet computer, a wearable device and the like. The terminal device is taken as an example of the executive entity below to illustrate the method for predicting flight delay. As shown in FIG. 1, the method in the embodiment of the present disclosure can include:

Step S101: acquiring flight historical data, where the flight historical data includes take-off amount and delay amount of flights during each of a plurality of time periods.

With respect to acquiring the flight historical data, the flight historical data may include the take-off amount and the delay amount of the flights during each of the plurality of time periods. The each of the plurality of time periods may be each hour, or may also be each two hours and the like; and the each of the plurality of time periods may have the same time interval, or may have different time intervals, which can be set specifically according to user demands and are not limited in embodiments of the present application.

Optionally, the flight historical data may also include at least one of the following: flight historical delay time, planned flight time, an airline company, a destination airport, a departure direction, a flight model, a planned take-off time period and a planned take-off date.

According to the flight historical delay time, a median of the flight historical delay time, a standard deviation of the flight historical delay time and the like may also be calculated. The flight historical data may also include a flight leg, and the flight leg may represent which flight it is among the flights that are executed by one aircraft in one day. According to the arrival time of a flight executed by an aircraft and the take-off time of the next flight executed by the aircraft, transit time of the flight and the like may also be acquired. There are no limitations to types of the flight historical data, the processing way of the flight historical data and the like in the embodiments of the present application.

Step S102: determining prior knowledge of each of the plurality of time periods according to the take-off amount and the delay amount of the flights during each of the plurality of time periods.

With respect to determining the prior knowledge of each of the plurality of time periods according to the take-off amount and the delay amount of the flights during each of the plurality of time periods, optionally, the delay rate of each day may be acquired according to the take-off amount and the delay amount of each day, where the delay rate is equal to the delay amount divided by the take-off amount (delay rate=delay amount/take-off amount), and then the prior knowledge of each of the plurality of time periods is determined according to the delay rate of each day and the take-off amount of each of the plurality of time periods. Optionally, in order to acquire more accurate prior knowledge, the delay situations of each day may be classified, and corresponding prior knowledge can be set according to each type of the delay situations and the take-off amount of each of the plurality of time periods. In a possible implementation, the delay situations of each day may be classified into three types, where the delay rate less than 30% is classified as less delay, the delay rate more than or equal to 30% and less than 45% is classified as normal delay, and the delay rate more than 45% is classified as more delay, which are not limited in the embodiments of the present application.

The present application does not limit the representation of the prior knowledge. Optionally, the prior knowledge may be represented using a linear inequality, for example, it may be expressed by a formula below:

$$M_k^T \cdot Y \leq N_k \quad k=1,2,\ldots,K \tag{1}$$

where $M_k$ represents a matrix of the actual take-off amount at the k-th take-off time period, $N_k$ represents a matrix of the historical statistical take-off amount at the k-th take-off time period, and Y represents a label matrix of data points. $Y=(y(x_1), y(x_2), \ldots, y(x_n))^T$, where $y(x_i)$ represents a label corresponding to a data point, $\varphi(x_i)$ represents a mapping of a data point $x_i$ and there exists $y(x_i)=\omega \cdot \varphi(x_i)+b$, where b represents a constant. $M_k^T$ represents a transposed matrix of $M_k$, k represents the take-off time period, and K represents the total number of the take-off time periods. Optionally, K may be set to be 23.

Optionally, $M_k$, $N_k$ may be determined according to the take-off amount per hour under three types of delay situations. For example, $M_k$ is the actual take-off amount at the k-th hour under three delay situations which are less delay, normal delay and more delay, and $N_k$ is the historical statistical take-off amount at the k-th hour under three delay situations which are less delay, normal delay and more delay.

Step S103: constructing a SVM prediction model according to the prior knowledge and a standard SVM model.

With respect to constructing the SVM prediction model according to the prior knowledge and the standard SVM model, the SVM prediction model can be constructed by adding the prior knowledge as a constraint condition into the standard SVM model.

The standard SVM model is:

$$\min \frac{1}{2}\|w\|^2 + C\sum_{i=1}^{n}(\xi_i + \xi_i^*) \tag{2}$$

$$\text{s.t.} \quad y_i - w \cdot \varphi(x_i) - b \leq \varepsilon + \xi_i$$

$$w \cdot \varphi(x_i) + b - y_i \leq \varepsilon + \xi_i^*$$

$$\xi_i \xi_i^* \geq 0, i = 1, 2, \ldots, n.$$

The constraint condition is the formula (1):

$$M_k^T \cdot Y \leq N_k \quad k=1,2,\ldots,K.$$

Where $\omega$ represents a vector, C represents a predetermined constant, which is used to control a weight between "searching for a hyperplane with the largest interval" and "ensuring the minimum deviation of the data points" in the target function $\xi_i^*$ is a slack variable which represents the amount for which the corresponding data point $x_i$ is allowed to deviate the hyperplane, $\xi_i^*$ is another slack variable, $x_i$ represents a data point, $y_i$ represent a label corresponding to the data point, $\varphi(x_i)$ represents a mapping of the data point $x_i$ and there exists $y(x_i)=\omega \cdot \varphi(x_i)+b$, where b represents a constant, $\varepsilon$ represents a minuscule and arbitrarily changeable positive number, i represents the i-th data point, n represents the total number of the data points, and other symbols have the same meanings as those in the formula (1).

According to the above formula (1) and formula (2), the SVM prediction model can be acquired. The embodiments of the present disclosure do not limit the implementations of how to acquire the SVM prediction model according to the above formula (1) and formula (2).

Specifically, the acquisition of the SVM prediction model according to the above formula (1) and formula (2) may be realized by introducing the Lagrange multiplier $L(w,b,\xi_i, \xi_i^*, \alpha, \alpha, \beta, \beta^*, \gamma)$. The Lagrange function of the optimization problem (2) is:

$$L(w, b, \xi_i, \xi_i^*, \alpha, \alpha^*, \beta, \beta^*, \gamma) = \frac{1}{2}\|w\|^2 + C\sum_{i=1}^{n}(\xi_i + \xi_i^*) -$$

$$\sum_{i=1}^{n}\alpha_i[\varepsilon + \xi_i - y_i + w \cdot \varphi(x_i) + b] - \sum_{i=1}^{n}\alpha_i^*[\varepsilon + \xi_i^* + y_i - w \cdot \varphi(x_i) - b] -$$

$$\sum_{i=1}^{n}(\beta_i \xi_i + \beta_i^* \xi_i^*) - \sum_{k=1}^{K}\gamma_i\left[N_k - \sum_{i=1}^{n}M_{ki}(w \cdot \varphi(x_i) + b)\right].$$

Where $\alpha, \alpha^*, \beta, \beta^*, \gamma \geq 0$ is a Lagrange multiplier, other symbols have the same meanings as those in the formula (2). Let a partial derivative of the Lagrange function for the variable $w, b, \xi_i, \xi_i^*$ be 0, it can be acquired that:

$$\frac{\partial L}{\partial w} = 0 \Rightarrow w = \sum_{i=1}^{n}\alpha_i\varphi(x_i) - \sum_{i=1}^{n}\alpha_i^*\varphi(x_i) - \sum_{i=1}^{n}\sum_{k=1}^{K}\gamma_k M_{ki}\varphi(x_i)$$

$$\frac{\partial L}{\partial b} = 0 \Rightarrow \sum_{i=1}^{n}\left(\alpha_i - \alpha_i^* - \sum_{k=1}^{K}\gamma_k M_{ki}\right) = 0$$

$$\frac{\partial L}{\partial \xi_i} = 0 \Rightarrow C - \alpha_i - \beta_i = 0$$

$$\frac{\partial L}{\partial \xi_i^*} = 0 \Rightarrow C - \alpha_i^* - \beta_i^* = 0.$$

Where $\frac{\partial L}{\partial \omega}$.

represents a partial derivative of the Lagrange function for w, $$\frac{\partial L}{\partial b}$$

represents a partial derivative of the Lagrange function for b, $$\frac{\partial L}{\partial \xi_i}$$

represents a partial derivative of the Lagrange function for $\xi_i$, and $$\frac{\partial L}{\partial \xi_i^*}$$

represents a partial derivative of the Lagrange function for $\xi_i^*$. Further, the corresponding dual optimization problem is:

$$\max -\frac{1}{2}\sum_{i=1}^{n}\left(\alpha_i - \alpha_i^* - \sum_{k=1}^{K}\gamma_k M_{ki}\right)\sum_{i=1}^{n}\left(\alpha_j - \alpha_j^* - \sum_{k=1}^{K}\gamma_k M_{kj}\right)\varphi(x_i)\varphi(x_j) +$$

$$\sum_{i=1}^{n} y_i(\alpha_i - \alpha_i^*) - \varepsilon\sum_{i=1}^{n}(\alpha_i - \alpha_i^*) - \sum_{k=1}^{K}\gamma_k N_k$$

$$\text{s.t. } \sum_{i=1}^{n}\left(\alpha_i - \alpha_i^* - \sum_{k=1}^{K}\gamma_k M_{ki}\right) = 0$$

$$\alpha, \alpha^* \in [0, C], i = 1, 2, \ldots, n$$

$$\gamma_k \geq 0, k = 1, 2, \ldots, K.$$

If there exists a kernel function Ker, let $\text{Ker}(x_i, x_j) = \varphi(x_i) \cdot \varphi(x_j)$ and let $$\lambda_i = \alpha_i - \alpha_i^* - \sum_{k=1}^{K}\gamma_k M_{ki}$$

the formula (2) can be converted into a formula (3).

$$\max -\frac{1}{2}\sum_{i,j=1}^{n}\lambda_i\lambda_j \text{Ker}(x_i, x_j) + \sum_{i=1}^{n} y_i(\alpha_i - \alpha_i^*) - \varepsilon\sum_{i=1}^{n}(\alpha_i - \alpha_i^*) - \sum_{k=1}^{K}\gamma_k N_k \quad (3)$$

$$\text{s.t. } \sum_{i=1}^{n}\lambda_i = 0.$$

Where Ker is a kernel function, $\lambda_i$ is a constant, other symbols have the same meanings as those in the formula (2). The formula (3) represents the SVM prediction model.

Step S104: predicting a flight delay situation according to the SVM prediction model.

With respect to predicting the flight delay situation according to the SVM prediction model, specifically, a delay distribution for each of the plurality of time periods of a date can be acquired according to the date that needs to be predicted. For example, normal take-off flights, flights delayed for from 30 minutes to 60 minutes and flights delayed for above 60 minutes in a certain time period of a certain day may be acquired. The embodiments of the present application do not limit the specific representations of the flight delay situation.

In order to improve the accuracy of the SVM prediction model, optionally, the predicting the flight delay situation according to the SVM prediction model includes:

selecting first flight historical data as a training set according to the flight historical data; training the SVM prediction model according to the first flight historical data, and acquiring a trained SVM prediction model; selecting second flight historical data as a test set according to the flight historical data; testing the SVM prediction model according to the second flight historical data; and predicting the flight delay situation according to the SVM prediction model that passes the test.

In the flight historical data, a part of the flight historical data may be selected as the first flight historical data, and the first flight historical data is used as the training set to train the SVM prediction model, so that the trained SVM prediction model is acquired; then the second flight historical data is selected as the test set according to the flight historical data, and the trained SVM prediction model is tested; and finally the flight delay situation is predicted according to the SVM prediction model that passes the test.

In an implementation, the predicting the flight delay situation according to the SVM prediction model that passes the test includes: judging whether the SVM prediction model passes the test; if the SVM prediction model passes the test, predicting the flight delay situation according to the SVM prediction model that passes the test; and if the SVM prediction model fails to pass the test, correcting the SVM prediction model according to massive delay response system (MDRS) information, until the SVM prediction model passes the test.

In an implementation, the judging whether the SVM prediction model passes the test includes: acquiring a third flight delay prediction result according to the SVM prediction model; comparing a fourth flight delay prediction result in the MDRS information with the third flight delay prediction result; if an error between the second flight delay prediction result and the third flight delay prediction result is smaller than and equal to a preset error threshold, judging the SVM prediction model as passing the test; and if the error between the second flight delay prediction result and the third flight delay prediction result is larger than the preset error threshold, judging the SVM prediction model as failing to pass the test. As for the details of the MDRS information and how to test and correct the SVM prediction model according to the MDRS information, reference could be made to the following description of steps S201 and S202, since the principles and implementations thereof are similar, with differences merely in stage and purpose.

Since the flight historical data may include multidimensional data, such as a median of the flight historical delay time, a standard deviation of the flight historical delay time, planned flight time, an airline company, a destination airport, a departure direction, a flight model, a flight number, transit time, a planned take-off time period, a planned take-off date and the like, in order to lower the complexity of the problem, optionally, the method for predicting flight delay provided in the embodiment of the present application further includes:

performing dimension reduction processing on the flight historical data according to the flight historical data.

With respect to performing the dimension reduction processing on the flight historical data according to the flight historical data, in a possible implementation, the dimension reduction may be performed on the flight historical data according to a principal component analysis. By taking the above flight historical data as an example, the flight historical data includes 11 features, and the dimension reduction processing may be performed on the 11 features in the flight historical data. The embodiments of the present disclosure do not limit the number of dimensions to be reduced. Optionally, the flight historical data may be processed as two dimensional data.

In another possible implementation, with respect to performing the dimension reduction on the flight historical data according to the flight historical data, the dimension reduction can be performed according to the weight of each of the feature data types in the flight historical data. For example, a data type with a larger weight may be selected as the flight historical data after the dimension reduction.

In this solution, by determining the prior knowledge of each of the plurality of time periods according to the take-off amount and the delay amount of the flights during each of the plurality of time periods in the flight historical data and constructing the SVM prediction model according to the prior knowledge and the standard SVM model, the accuracy of the SVM prediction model is improved; and further by predicting the flight delay situation according to the SVM prediction model, the prediction of the flight delay situation for each of the plurality of time periods is achieved and the reliability of the flight delay prediction is improved.

Figure 2:
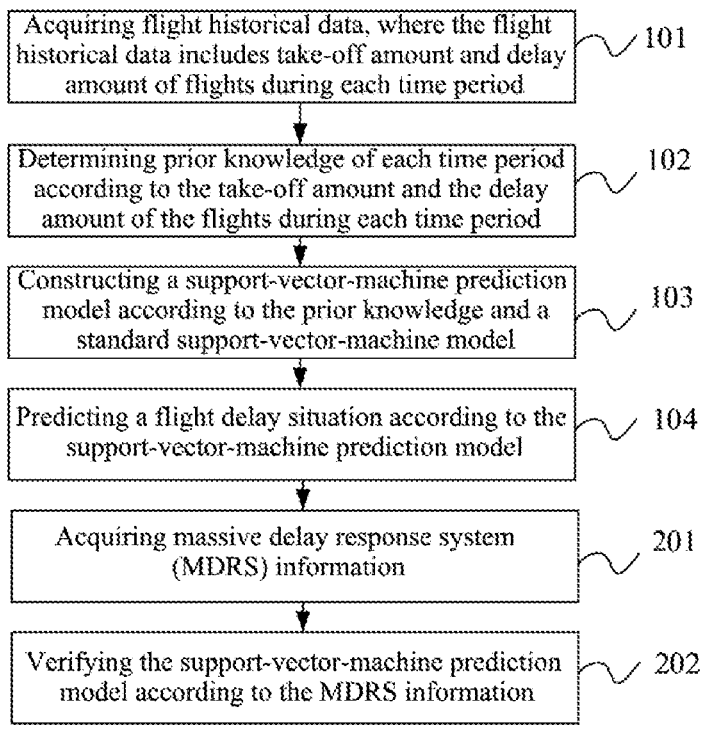
FIG. 2 is a schematic flowchart of a method for predicting flight delay provided in another embodiment of the present disclosure.

In order to improve the accuracy of the SVM prediction model, the SVM prediction model may also be updated according to other prediction data or actual operation data, which is not limited in the embodiments of the present disclosure. Optionally, FIG. 2 is a schematic flowchart of a method for predicting flight delay provided in another embodiment of the present disclosure. The method may be implemented by an apparatus for predicting flight delay, and the apparatus may be implemented d by means of software and/or hardware. For example, the apparatus may be a part or all of a terminal device, or a part or all of a server. The terminal device may be a personal computer, a smart phone, a user terminal, a tablet computer, a wearable device and the like. The terminal device is taken as an example of the executive entity below to illustrate the method for predicting flight delay. As shown in FIG. 2, the method in the embodiment of the present disclosure can include the following steps.

Step S201: acquiring massive delay response system (MDRS) information.

The MDRS is a system for pre judging and managing the massive flight delay caused by significant weather and other reasons, and the main content thereof is to predict, by the air traffic flow management (ATFM) department, the degree of the influence of the significant weather on the airspace and a capacity value of the air traffic according to a probability forecast of the significant weather. With respect to acquiring the MDRS information, the MDRS information may be acquired according to information issued by ATFM, and the MDRS information may include the predicted flight delay situation, which is not limited in the embodiments of the present disclosure.

Step S202: verifying the SVM prediction model according to the MDRS information.

Optionally, the verifying the SVM prediction model according to the MDRS information includes:

acquiring a first flight delay prediction result according to the SVM prediction model; comparing a second flight delay prediction result in the MDRS information with the first flight delay prediction result; and updating the SVM prediction model according to the MDRS information, if an error between the second flight delay prediction result and the first flight delay prediction result is larger than a preset error threshold.

The first flight delay prediction result is acquired according to the SVM prediction model, where the first flight delay prediction result is the predicted flight delay situation acquired according to the SVM prediction model. And then the second flight delay prediction result in the MDRS information is compared with the first flight delay prediction result, where the second flight delay prediction result is the predicted flight delay situation in the MDRS information. In addition, with respect to comparing the first flight delay prediction result with the second flight delay prediction result, for example, it may be that the flight delay time and delay flights for each of the plurality of time periods in the first flight delay prediction result and the second flight delay prediction result are compared, respectively. If the error between the second flight delay prediction result and the first flight delay prediction result is larger than the preset error threshold, then the SVM prediction model is updated according to the MDRS information. The error between the first flight delay prediction result and the second flight delay prediction result may be acquired according to the error of each of the plurality of time periods. The preset error threshold may be set according to actual demands, which is not limited in the embodiments of the present application.

With respect to updating the SVM prediction model according to the MDRS information, in a possible implementation, the MDRS information may be used as the prior knowledge, according to which a constraint condition is set, and the SVM prediction model may be updated according to the constraint condition and the formula (3), which is not limited in the embodiments of the present disclosure.

In this solution, by comparing the flight delay prediction result acquired according to the SVM prediction model with the flight delay prediction result in the MDRS information, and updating the SVM prediction model according to the MDRS information when the error between two kinds of flight delay prediction results is larger than the preset error threshold, the accuracy of the SVM prediction model is improved.

The following are an apparatus for predicting flight delay, a device, a storage medium and a computer program product provided in embodiments of the present application, and the method embodiments can be referred to for content and effects thereof.

Figure 3:
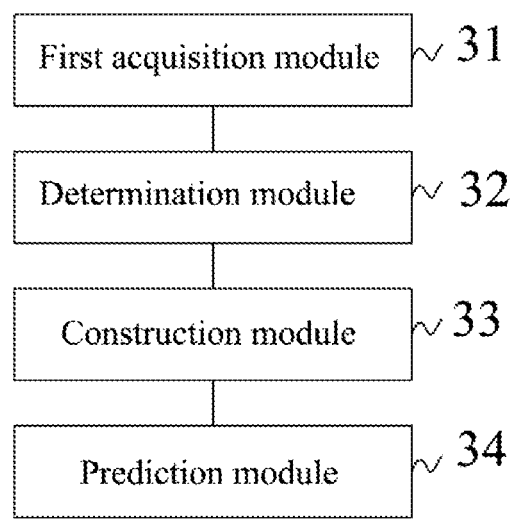
FIG. 3 is a schematic structural diagram of an apparatus for predicting flight delay provided in an embodiment of the present disclosure.

FIG. 3 is a schematic structural diagram of an apparatus for predicting flight delay provided in an embodiment of the present disclosure. The apparatus may be implemented by means of software and/or hardware. For example, the apparatus may be a part or all of a terminal device, or a part or all of a server. The terminal device may be a personal computer, a smart phone, a user terminal, a tablet computer, a wearable device and the like. As shown in FIG. 3, the apparatus for predicting flight delay in the embodiment of the present disclosure includes the following modules.

A first acquisition module 31, configured to acquire flight historical data, where the flight historical data includes take-off amount and delay amount of flights during each of the plurality of time periods.

Optionally, the flight historical data further includes at least one of the following:

flight historical delay time, planned flight time, an airline company, a destination airport, a departure direction, a flight model, a planned take-off time period and a planned take-off date.

A determination module 32, configured to determine prior knowledge of each of the plurality of time periods according to the take-off amount and the delay amount of the flights during each of the plurality of time periods.

A construction module 33, configured to construct a SVM prediction model according to the prior knowledge and a standard SVM model.

A prediction module 34, configured to predict a flight delay situation according to the SVM prediction model.

Optionally, the prediction module 34 is specifically configured to:

select first flight historical data as a training set according to the flight historical data;

train the SVM prediction model according to the first flight historical data, and acquire a trained SVM prediction model;

select second flight historical data as a test set according to the flight historical data;

test the SVM prediction model according to the second flight historical data; and predict the flight delay situation according to the SVM prediction model that passes the test.

Figure 4:
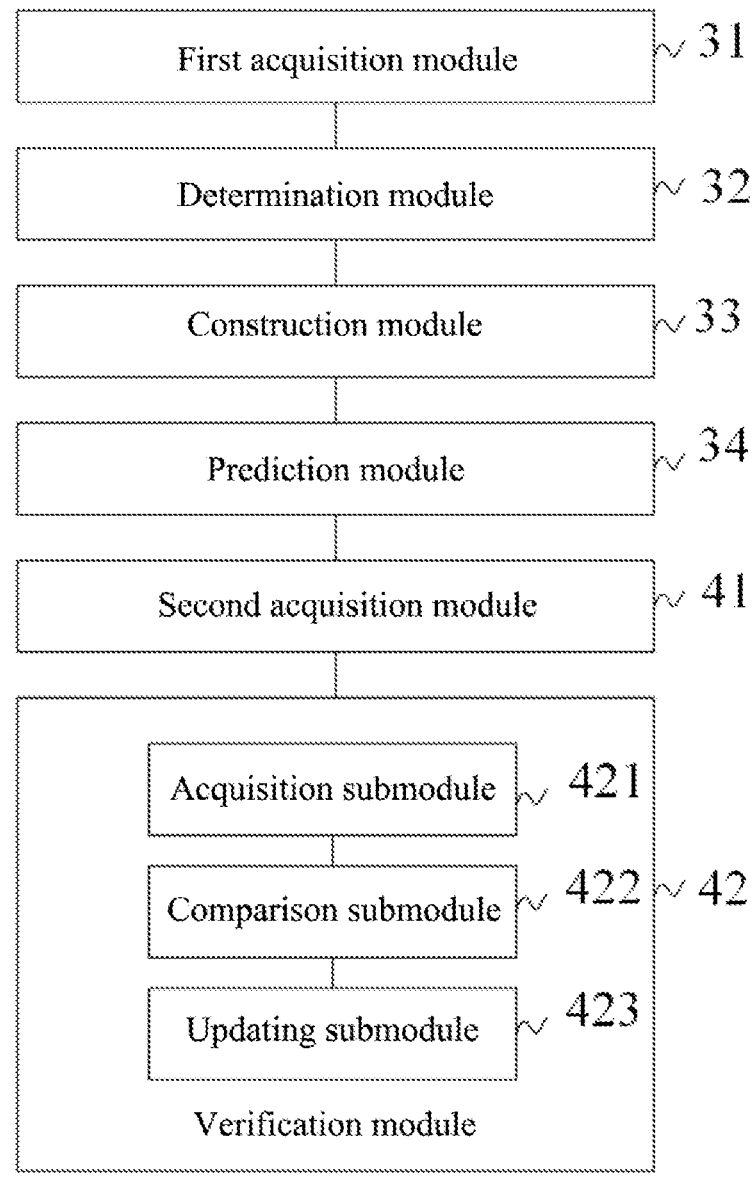
FIG. 4 is a schematic structural diagram of an apparatus for predicting flight delay provided in another embodiment of the present disclosure.

Optionally, FIG. 4 is a schematic structural diagram of an apparatus for predicting flight delay provided in another embodiment of the present disclosure. The apparatus may be implemented by means of software and/or hardware. For example, the apparatus may be a part or all of a terminal device, or a part or all of a server. The terminal device may be a personal computer, a smart phone, a user terminal, a tablet computer, a wearable device and the like. As shown in FIG. 4, the apparatus for predicting flight delay in the embodiment of the present disclosure can further includes:

a second acquisition module 41, configured to acquire massive delay response system (MDRS) information; and a verification module 42, configured to verify the SVM prediction model according to the MDRS information.

Optionally, as shown in FIG. 4, the verification module 42 includes:

an acquisition submodule 421, configured to acquire a first flight delay prediction result according to the SVM prediction model;

a comparison submodule 422, configured to compare a second flight delay prediction result in the MDRS information and the first flight delay prediction result; and an updating submodule 423, configured to update the SVM prediction model according to the MDRS information, if an error between the second flight delay prediction result and the first flight delay prediction result is larger than a preset error threshold.

Figure 5:
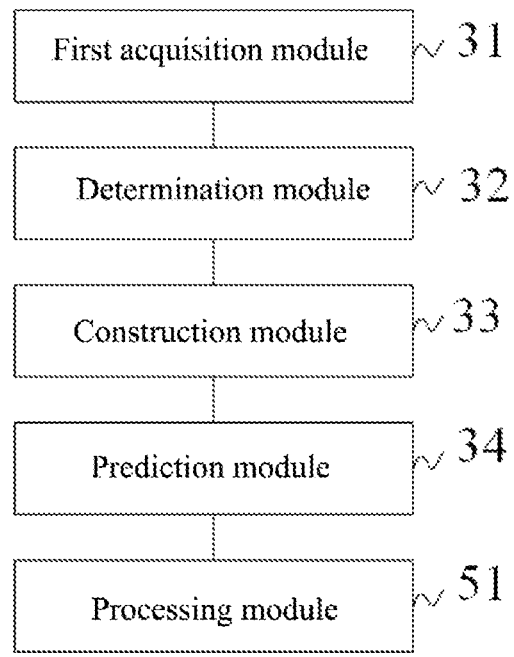
FIG. 5 is a schematic structural diagram of an apparatus for predicting flight delay provided in still another embodiment of the present disclosure.

Optionally, FIG. 5 is a schematic structural diagram of an apparatus for predicting flight delay provided in still another embodiment of the present disclosure. The apparatus may be implemented by means of software and/or hardware. For example, the apparatus may be a part or all of a terminal device, or a part or all of a server. The terminal device may be a personal computer, a smart phone, a user terminal, a tablet computer, a wearable device and the like. As shown in FIG. 5, the apparatus for predicting flight delay in the embodiment of the present disclosure can further include:

a processing module 51, configured to perform dimension reduction processing on the flight historical data according to the flight historical data.

Figure 6:
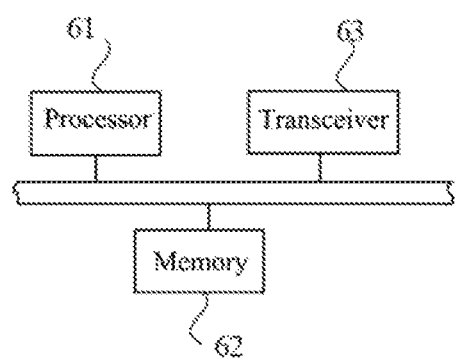
FIG. 6 is a schematic structural diagram of a device provided in an embodiment of the present disclosure.

An embodiment of the present application provides a device. FIG. 6 is a schematic structural diagram of a device provided in an embodiment of the present disclosure. As shown in FIG. 6, the device includes:

a processor 61, a memory 62, a transceiver 63 and a computer program;

where the transceiver 63 is configured to implement a data transmission between a sever and other devices; the computer program is stored in the memory 62 and configured to be executed by the processor 61, and the computer program includes instructions for implementing the above methods for predicting flight delay. The method embodiments can be referred to for the content and effects thereof.

In addition, an embodiment of the present application provides a computer readable storage medium, where the computer readable storage medium has a computer program stored thereon, and when the computer program is executed by at least one processor of a user equipment, the user equipment implements the above various possible methods.

An embodiment of the present disclosure provides a computer program product, including: executable instructions for implementing the method for predicting flight delay in the above method embodiments.

Those skilled in the art can understand that a part or all of the steps for realizing the above method embodiments may be completed via hardware relative to program instructions. The forgoing program may be stored in a computer readable storage medium. When the program is executed, steps including those of the above method embodiments are implemented. And the foregoing storage medium includes various media that can store program code, such as a ROM, a RAM, a diskette or an optical disk.

Finally, it should be noted that: the above embodiments are merely used for illustrating the technical solutions of the present disclosure, but not being construed as limiting the present disclosure. Although the present disclosure is described in detail with reference to the forgoing embodiments, those skilled in the art should understand that modifications may still be made to the technical solutions of the forgoing various embodiments or equivalent replacements may be made to a part or all of the technical features therein. These modifications or replacements do not make the essence of corresponding technical solutions depart from the scope of the technical solutions of the embodiments of the present disclosure.

What is claimed is:

1. A method for predicting flight delay, comprising:
    acquiring flight historical data, wherein the flight historical data comprises take-off amount and delay amount of flights during each of a plurality of time periods;
    determining prior knowledge of each of the plurality of time periods according to the take-off amount and the delay amount of the flights during each of the plurality of time periods;
    constructing a support-vector-machine (SVM) prediction model according to the prior knowledge and a standard SVM model; and
    predicting a flight delay situation according to the SVM prediction model;
    wherein the method further comprises:
    acquiring massive delay response system (MDRS) information; and
    verifying the SVM prediction model according to the MDRS information.

2. The method according to claim 1, wherein the verifying the SVM prediction model according to the MDRS information comprises:
    acquiring a first flight delay prediction result according to the SVM prediction model;
    comparing a second flight delay prediction result in the MDRS information with the first flight delay prediction result; and
    updating the SVM prediction model according to the MDRS information, if an error between the second flight delay prediction result and the first flight delay prediction result is larger than a preset error threshold.

3. The method according to claim 1, wherein the flight historical data further comprises at least one of the following:
    flight historical delay time, planned flight time, an airline company, a destination airport, a departure direction, a flight model, a planned take-off time period and a planned take-off date.

4. The method according to claim 3, wherein the predicting the flight delay situation according to the SVM prediction model comprises:
    selecting first flight historical data as a training set according to the flight historical data;

training the SVM prediction model according to the first flight historical data, and acquiring a trained SVM prediction model;

selecting second flight historical data as a test set according to the flight historical data;

testing the trained SVM prediction model according to the second flight historical data; and predicting the flight delay situation according to the SVM prediction model that passes the test.

5. The method according to claim 4, wherein further comprising:

performing dimension reduction processing on the flight historical data according to the flight historical data.

6. A device for predicting flight delay, comprising:

a processor;

a memory; and a computer program;

wherein the computer program is stored in the memory and configured to be executed by the processor, and the computer program comprises instructions for implementing steps of:

acquiring flight historical data, wherein the flight historical data comprises take-off amount and delay amount of flights during each of a plurality of time periods;

determining prior knowledge of each of the plurality of time periods according to the take-off amount and the delay amount of the flights during each of the plurality of time periods;

constructing a SVM prediction model according to the prior knowledge and a standard SVM model; and predicting a flight delay situation according to the SVM prediction model;

wherein the computer program further comprises instructions for implementing steps of:

acquiring massive delay response system (MDRS) information; and verifying the SVM prediction model according to the MDRS information.

7. The device according to claim 6, wherein the verifying the SVM prediction model according to the MDRS information comprises:

acquiring a first flight delay prediction result according to the SVM prediction model;

comparing a second flight delay prediction result in the MDRS information with the first flight delay prediction result; and updating the SVM prediction model according to the MDRS information, if an error between the second flight delay prediction result and the first flight delay prediction result is larger than a preset error threshold.

8. The device according to claim 6, wherein the flight historical data further comprises at least one of the following:

flight historical delay time, planned flight time, an airline company, a destination airport, a departure direction, a flight model, a planned take-off time period and a planned take-off date.

9. The device according to claim 8, wherein the predicting the flight delay situation according to the SVM prediction model comprises:

selecting first flight historical data as a training set according to the flight historical data;

training the SVM prediction model according to the first flight historical data, and acquiring a trained SVM prediction model;

selecting second flight historical data as a test set according to the flight historical data;

testing the trained SVM prediction model according to the second flight historical data; and predicting the flight delay situation according to the SVM prediction model that passes the test.

10. The device according to claim 9, wherein the computer program further comprises instructions for implementing steps of:

performing dimension reduction processing on the flight historical data according to the flight historical data.

11. A non-transitory computer readable storage medium, wherein the non-transitory computer readable storage medium has a computer program stored thereon, and the computer program causes a server to implement steps of:

acquiring flight historical data, wherein the flight historical data comprises take-off amount and delay amount of flights during each of a plurality of time periods;

determining prior knowledge of each of the plurality of time periods according to the take-off amount and the delay amount of the flights during each of the plurality of time periods;

constructing a SVM prediction model according to the prior knowledge and a standard SVM model; and predicting a flight delay situation according to the SVM prediction model;

wherein the computer program further causes the server to implement steps of:

acquiring massive delay response system (MDRS) information; and verifying the SVM prediction model according to the MDRS information.

12. The non-transitory computer readable storage medium according to claim 11, wherein the verifying the SVM prediction model according to the MDRS information comprises:

acquiring a first flight delay prediction result according to the SVM prediction model;

comparing a second flight delay prediction result in the MDRS information with the first flight delay prediction result; and updating the SVM prediction model according to the MDRS information, if an error between the second flight delay prediction result and the first flight delay prediction result is larger than a preset error threshold.

13. The non-transitory computer readable storage medium according to claim 11, wherein the flight historical data further comprises at least one of the following:

flight historical delay time, planned flight time, an airline company, a destination airport, a departure direction, a flight model, a planned take-off time period and a planned take-off date.

14. The non-transitory computer readable storage medium according to claim 13, wherein the predicting the flight delay situation according to the SVM prediction model comprises:

selecting first flight historical data as a training set according to the flight historical data;

training the SVM prediction model according to the first flight historical data, and acquiring a trained SVM prediction model;

selecting second flight historical data as a test set according to the flight historical data;

testing the trained SVM prediction model according to the second flight historical data; and predicting the flight delay situation according to the SVM prediction model that passes the test.

15. The non-transitory computer readable storage medium according to claim 14, wherein the computer program further causes the server to implement step of:

performing dimension reduction processing on the flight historical data according to the flight historical data.

* * * * *